United States Patent [19]
Okada et al.

[11] Patent Number: 5,652,858
[45] Date of Patent: Jul. 29, 1997

[54] METHOD FOR PREFETCHING POINTER-TYPE DATA STRUCTURE AND INFORMATION PROCESSING APPARATUS THEREFOR

[75] Inventors: Tetsuhiko Okada, Hachioji; Osamu Nishii, Inagi; Hiroshi Takeda, Higashi-Yamato, all of Japan

[73] Assignee: Hitachi, Ltd., Tokyo, Japan

[21] Appl. No.: 455,335

[22] Filed: May 31, 1995

[30] Foreign Application Priority Data

Jun. 6, 1994 [JP] Japan ................................. 6-123475

[51] Int. Cl.⁶ ..................................................... G06F 13/00
[52] U.S. Cl. ........................... 395/464; 395/465; 395/872; 364/DIG. 1
[58] Field of Search ....................... 395/464, 465, 395/872

[56] References Cited

U.S. PATENT DOCUMENTS

| | | | |
|---|---|---|---|
| 5,201,041 | 4/1993 | Bohner et al. | 395/465 |
| 5,317,718 | 5/1994 | Jouppi | 395/464 |
| 5,361,391 | 11/1994 | Westberg | 395/464 |
| 5,371,870 | 12/1994 | Goodwin et al. | 395/872 |
| 5,461,718 | 10/1995 | Tatosian et al. | 395/416 |
| 5,499,355 | 3/1996 | Krishnamohan et al. | 395/464 |
| 5,506,976 | 4/1996 | Jaggar | 395/464 |
| 5,537,573 | 7/1996 | Ware et al. | 395/464 |

OTHER PUBLICATIONS

"Software Prefetching"; D. Callahan et al.; *ACM* ©1991. pp. 40–52.
"Architecture and Evaluation of OCHANOMIZ-1"; The University of Tokyo; G. Nakazato et al.; pp. 57–64; ©1993.
"PA-RISC 1.1 Architecture and Instruction Set Reference Manual"; Hewlett Packard; pp. 5–42, 5–17, and 5–18; ©1994.

*Primary Examiner*—Frank J. Asta
*Attorney, Agent, or Firm*—Fay, Sharpe, Beall, Fagan, Minnich & McKee

[57] ABSTRACT

In order to allow prefetching of pointer-type data structure, an instruction word of load instruction has pointer hints indicating that the data being loaded by the instruction comprises a pointer specifying the address of the next data. When a CPU executes such an instruction, and the data requested by that instruction is loaded from a main memory, a prefetch circuit in a memory interface circuit uses this pointer to read a block containing the data specified by this pointer from the main memory, then stores temporarily in a prefetch buffer provided therein. When CPU executes a load instruction requesting reading of the data specified by this pointer, the data in this stored block is supplied to CPU through a processor interface circuit and a cache control circuit.

17 Claims, 6 Drawing Sheets

METHOD FOR PREFETCHING POINTER-TYPE DATA STRUCTURE AND INFORMATION PROCESSING APPARATUS THEREFOR

BACKGROUND OF THE INVENTION

The present invention relates to a method for prefetching data, which is contained in a so-called pointer-type data structure consisting of a plurality of elementary data each including data and addresses of other data.

The performance of processors has been improved recently, whereas the speed of memory did not follow. Then there have been methods for improving the performance of an information processing apparatus by using cache memory. As cache memory stores only a copy of part of main memory, there may be or not desired data in the cache memory (cache miss hit). In such case, the processor has to wait until the data is read out from the main memory, for starting next processing. This causes overhead cycles. There have been proposed a variety of methods for avoiding this overhead. Data prefetching method is one of them. The concept of this method is to store in advance into the cache memory data which may result in cache misses prior to use them. In this method, the performance of the information processing apparatus may be improved by performing prefetching of data from main memory to cache memory and other processes in parallel.

For the data prefetching method, Callahan et. al., "Software Prefetching," ASPLOS-IV Proceedings, April 1991, pp. 40-52 discusses known hardware prefetching methods, and proposes a software prefetching method as a better solution. For example, one of the previously known hardware prefetching methods is to use a circuit for prefetching one of lines when the last address of the immediately previous line in the cache is accessed. On the other hand, in software prefetching, an instruction is performed to prefetch and store in the cache memory data which are expected to be accessed by a software prior to its actual access.

The reference cited above teaches that the software prefetching may be applied to, for example, an array-type data structure. The array-type data structure comprises data stored in memory locations of a plurality of addresses which are continuous or spaced-apart by a given address interval. This allows the address of the next data to be fetched to be determined prior to actual reading of its array-type data structure by using the address of the data at the leading location of that array-type data structure and the address spacing. Thus the next data to be read out may be loaded in the cache memory by preliminarily instructing from software.

In addition, there has been proposed hardware capable of prefetching such an array-type data structure. For example, in the reference No. 2: "Architecture and evaluation of Ocyanomizu-1." research report for information processing society, Computer Architecture 101-8, Aug. 20, 1993, pp. 57-64, a processor reads an array-type data structure from main memory before using that array-type data structure to load and store it in a buffer memory for prefetching, provided in addition to cache memory such that the processor may read any elementary data in the array-type data structure from the buffer for prefetching, when processing the data element. The time to load the array data from main memory is not apparently seen from the processor.

One of data structure frequently used in software other than the array-type data structure is a pointer-type data structure, which has structure connected by pointers. The pointer-type data structure viewed from software is shown in FIG. 6, and an example of this type of data structure allocated in the main memory is shown in FIG. 7. Each of the elementary data 10, 20, and 30 constituting such data structures includes a plurality of entries 11-14, 21-24, and 31-34, and each elementary data comprises a pointer specifying successive elementary data in one of entries such as 11, 21, and 31. In the example shown in FIG. 7 the pointer is the address of the successive elementary data.

For reading a plurality of elementary data classified into the pointer-type data structure from memory 90, a load instruction for reading the leading elementary data such as 10 from a memory 90 is initially performed to thereby read that leading elementary data from memory. Then a plurality of instructions for processing data contained within respective entries 12-14 of that elementary data are performed. Thereafter, from the memory location having the address of the second elementary data contained in the leading entry 11, another load instruction is issued for fetching next elementary data. Thus the addresses of the elementary data except the leading data is found when the preceding elementary data is fetched from memory.

Therefore, in the method of software prefetching referenced in the reference No. 1, the prefetching is expected not to be much effective for the pointer-type data structure.

The reference No. 2 explains a method for performing hardware prefetching for the array data, however no explanation is disclosed for the method how to perform hardware prefetching for the pointer-type data structure or other structures. Thus, there was no method for prefetching applied to the pointer-type data structure in the Prior Art.

The pointer-type data structure is not only frequently used by programs written in list processing languages but also frequently used by operating systems. Therefore, in order to improve the speed performance of operating systems, it is preferable to improve the time needed for fetching the pointer-type data structure.

SUMMARY OF THE INVENTION

The object of the present invention is to provide a method for prefetching pointer-type data structure and information processing apparatus therefor.

According to the present invention, the method for prefetching data structure comprises:
  reading, according to the fact that a first instruction requiring to read first data from a memory maintaining data is performed at a processing apparatus, the first data from first memory location of the memory;
  providing to the processing apparatus the first data having been read out;
  prefetching, according to the fact that if the first data contain address information on second data located in the memory the first instruction comprises information to be included specifically in the first instruction, the second data from second memory location of the memory specified by the first data;
  storing temporarily the prefetched second data; and
  providing the stored second data to the processing apparatus according to the fact that, after having read the second data from the memory, the second instruction having been performed in the processing apparatus requires to read out the second data from the memory.

More specifically, the first instruction is a loading instruction, and in the prefetching mentioned above, other data is prefetched by using data loaded by the loading instruction when the pointer hint information contained in a specific field within the instruction indicates that the data loaded by that instruction contains the pointer for loading other data.

DESCRIPTION OF EMBODIMENTS

Figure 1:
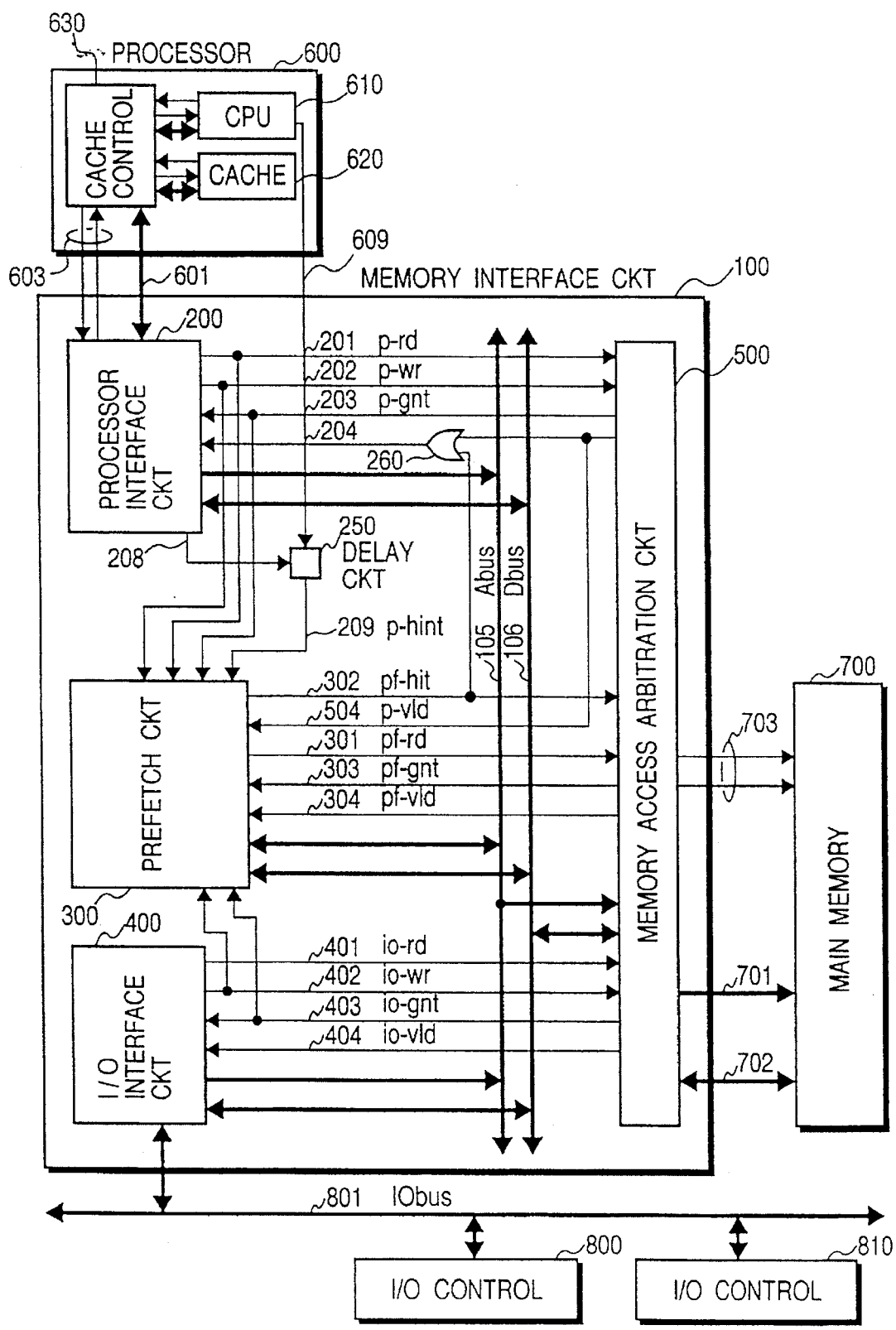
FIG. 1 shows a first embodiment of an information processing apparatus performing a method for prefetching data according to the present invention.

The data prefetching method according to the present invention will be described in greater details hereinafter with reference to embodiments shown in the accompanying drawings. The same reference numerals are used for designating to the identical or similar member or component.

FIRST EMBODIMENT

In FIG. 1, the reference numeral 600 designates a processor, 700 a main memory, and 100 a memory interface circuit.

The processor 600 comprises a CPU 610, a cache 620, and a cache control circuit 630. The CPU 610 is capable of executing loading instructions containing pointer hint information for prefetching data so as to be able to provide the pointer hint information to the memory interface circuit 100 through a line 609.

The memory interface circuit 100 comprises a processor interface circuit 200, an I/O bus interface circuit 400, a prefetch circuit 300, and a memory access arbitration circuit 500. The processor interface circuit 200 is connected to the processor 600 through a bus 601, a control signal line 603, and a hint signal line 609, for receiving access requests to a main memory 700 from the processor 600 in order to supply to the memory access arbitration circuit 500. The I/O bus interface circuit 400 is connected to I/O control circuits 800 and 810 through a bus 801 for receiving main memory access requests from the I/O control circuit 800 and 810 in order to supply to the memory access arbitration circuit 400. The prefetch circuit 300 is a circuit characterizing the present invention, in which if the data requested by the loading instruction received at the processor interface circuit 200 is a pointer to another data, at the time when the data requested by that loading instruction is read out from the main memory 700, it prefetches another data by using that loaded data. The memory access arbitration circuit 500 is connected to the main memory 700 through an address bus 701, a data bus 702, and a control signal line 703 in order to selecting one of memory access requests provided from the processor interface circuit 200 and the prefetch circuit 300 to supply it to the main memory 700. Since the read/write processes to the main memory are usually performed by one by one block basis, the memory read and the memory write are supposed to be performed by one by one block basis for the main memory.

(CPU)

Figure 8:
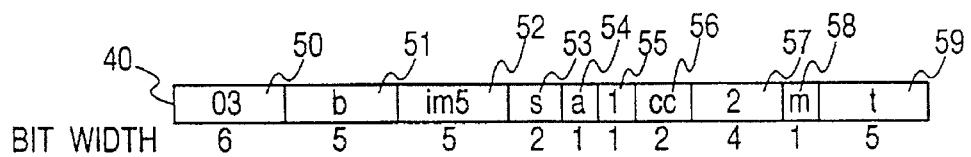
FIG. 8 shows an example of instruction format used for the apparatus shown in FIG. 1.

In the present embodiment, instructions such as ones listed in "PA-RISC 1.1 Architecture and Instruction Set Reference Manual, Third Edition," Hewlett-Packard, Feb., 1994 may be used for performing at the CPU 610. More specifically, the present embodiment may use the "load word short" (LDWS) instruction indicated in pp. 5–42 of the above manual for the instruction to load the memory data. This instruction 40 has the format shown in FIG. 8, and comprises fields 50 to 59. The field 50 stores an instruction code, which requests to load from the main memory the data having the sum of the sign expanded value of 5 bits immediate data IM5 stored in the field 52 and the contents of the general purpose register (not shown) stored in the field 51 to store in the general purpose register indicated by the field 59. According to the manual above, pp. 5–17 to 5–18, cc in the field 56 is comprised of 2 bits of cache control hint bits. If the value of the field 56 is 2, it is used as a hint of spatial locality. If that value is 1 or 3, the use is not yet defined. If the value of these hint bits is 0, it is treated as no hint. Thus in the present embodiment, if the instruction with this format is used as conventional loading instruction, the value of the hint is set to 0. However, if the instruction with this format is used for the loading instruction performing also the prefetch, which is characteristic to the present invention, the value of the hint is to be set to 1, for example. Therefore, when performing this instruction, the CPU 610 is composed so as to output the hint value to the memory interface circuit 100 through the hint signal line 609. That is, when the data that the loading instruction is to load is a pointer, i.e., data associating to the address of another data, and that the prefetch using the another data as an address is requested, the hint value is set to 1. Hereinafter, this hint in an instruction is referred to a pointer hint, and the loading instruction having a pointer hint to request such prefetching is referred to a loading instruction with a pointer hint, as well as the loading instruction having a pointer hint not to request such prefetching is referred to a loading instruction without pointer hint.

Similar to the Prior Art, the CPU 610 calculates the address of the data to be loaded from the memory to supply this address and its associated read request to the cache control circuit 630. In the present embodiment, it is supposed that the memory address to be supplied to the cache control circuit 630 by the CPU 610 indicates the real address in the main memory 700, and when the data loaded from the main memory 700 by using any one of loading instructions is an address of another data, that data indicates the real address of the another data. Additionally, although the CPU performs also store instructions having similar format, it will not be described here.

(Cache control circuit 630)

The cache control circuit 630 operates similarly to one well known. That is, when the CPU 610 performs an instruction requesting access to the main memory as if a loading instruction or store instruction to data located in any address within the main memory 700, it supplies the read request or write request on that data to the cache control circuit 630. The cache control circuit 630 performs hit check so as to see if the cache 620 hits that data so that if the instruction is a loading instruction, it reads data requested by the instruction from the cache 620 to supply data to the CPU 610, and if the instruction is a store instruction, it writes the data specified by that instruction to the cache 620. As a result of the hit check, when the cache misses, and the instruction is a loading instruction, the cache 620 supplies the read request containing memory address to be loaded through the control signal line 603 and the bus 601 to the memory interface circuit 100. Thereafter, as a response to this read request, when a block containing data requested by the memory interface circuit 100 is supplied, the requested data within that block is transferred to the CPU 610 and the block is written on the cache 620. If the instruction is a store instruction, the write request containing write data and store address transferred from the CPU 610 are supplied to the memory interface circuit 100.

(Memory interface circuit 100)

Here, the operation of the memory interface circuit 100 for the read request supplied from the CPU 610 will be described in greater details. The process for the write request will be described briefly for understanding the present embodiment since it may be readily inferred from the read request.

(Memory read operation)

When the memory interface circuit 100 performs memory read, it controls the main memory 700 via the control signal line 703 to read data from the main memory 700 to reply the loaded data to the read request supplier.

When receiving read request from the processor 600, the memory interface circuit 100 sets a read request signal p-rd 201 high in order to request the internal buses 105 and 106 to the memory access arbitration circuit 500. The memory access arbitration circuit 500 arbitrates and outputs a bus grant signal p-gnt on the line 203 to grant the bus to the processor interface circuit 200. The processor interface circuit 200, receiving the bus grant signal p-gnt, supplies the read address provided by the processor 600 to the memory access arbitration circuit 500 via the internal bus 105 in the next cycle. The memory access arbitration circuit 500 reads the main memory 700 at that address to transfer data to the processor interface circuit 200 through the data bus 106. At that time, the memory access arbitration circuit 500 outputs a data valid signal p-vld onto the line 504. The signal p-vld is then supplied to the processor interface circuit 200 through an OR gate 206 and the line 204 to thereby notify the circuit 200 that the data on the data bus 106 is valid. The processor interface circuit 200, in response to the data valid signal p-vld, captures the data on the data bus 106 to transfer it to the processor 600. The memory access arbitration circuit 500 and the processor interface circuit 200 both repeat the above described operation for reading a plurality of remained data in the block to which the data with this read address belongs, in the present embodiment three items of data, for example. Thus, four items of data have been sequentially transferred between the memory access arbitration circuit 500 and the processor interface circuit 200, and four data valid signals have been supplied from the latter to the former. Then the processor interface circuit 200 and the memory access arbitration circuit 500 terminate the reading process. Essentially, this operation is the same as the conventional memory interface circuit or the memory access arbitration circuit 500.

(Memory write operation)

In the memory write operation, the memory interface circuit 100 controls the main memory 700 through the control signal line 703 to write on the main memory 700 the data supplied form the write request supplier. That is, in the memory write operation, the processor interface circuit 200 sets a write request signal p-wr high, instead of the read request signal p-rd, to transfer an address through the internal address bus 105 in the next cycle when receiving a bus grant signal p-gnt, then it transfers data to the memory access arbitration circuit 500 through the data bus 106 in the successive four cycles to terminate the write operation.

The processor interface circuit 200 is similar to that in the Prior Art except that it provides control signals to the delay circuit 250 described below. Also, the function of the memory access arbitration circuit 500 is essentially similar to that in the Prior Art, except that in the present embodiment it arbitrates not only the memory access request from the processor interface circuit 200 and the I/O bus interface circuit 400 but also the memory access request from the prefetch circuit 300, and that after accessing the memory by the memory read request from the processor interface circuit 200, it invalidates the memory read operation if a prefetch signal pf-hit is provided from the prefetch circuit 300.

(Prefetch circuit 300)

In the memory interface circuit 100 of the present embodiment, the difference from the conventional circuit is that it is connected to the processor 600 through a hint signal line 609 and has the prefetch circuit 300 prefetching based on the pointer hint information on the hint signal line 609.

The processor interface circuit 200 controls the delay circuit 250 through a signal line 208 to supply to the prefetch circuit 300 through a line 209 the hint signal on the hint signal line 609 at the same timing as it supplies the read request signal p-rd 201 to the memory access arbitration circuit 500.

When the hint signal 209 is a hint with pointer, i.e., when the signal is 1, the prefetch circuit 300 uses the data read by the read process of the processor interface circuit 200 as described later, for an address to issue a read request to the main memory 700 to prefetch a block containing the data at that address to temporarily store in the prefetch circuit 300. Thereafter, it monitors whether or not a read request p-rd or a write request p-wr is output from the processor interface circuit 200 according to the succeeding loading instruction or store instruction performed by the prefetch circuit 300 and the processor 600. When the read request p-rd or write request p-wr is output, it determines whether or not the part of block address in the reading address or writing address output to the internal bus 105 at that time is matched to the address of the prefetched block. If it matches, and the request is a read request, it supplies the prefetched block stored in the prefetch circuit 300 to the processor through the processor interface circuit 200. This allows the prefetched data to be supplied to the processor 600 instead of that data, before the data requested by the read request is loaded from the main memory 700. Also, if it matches and the request is a write request, it invalidates the prefetched block, since in this case the data in the main memory is updated, and the prefetched block be the old block before update.

Figure 2:
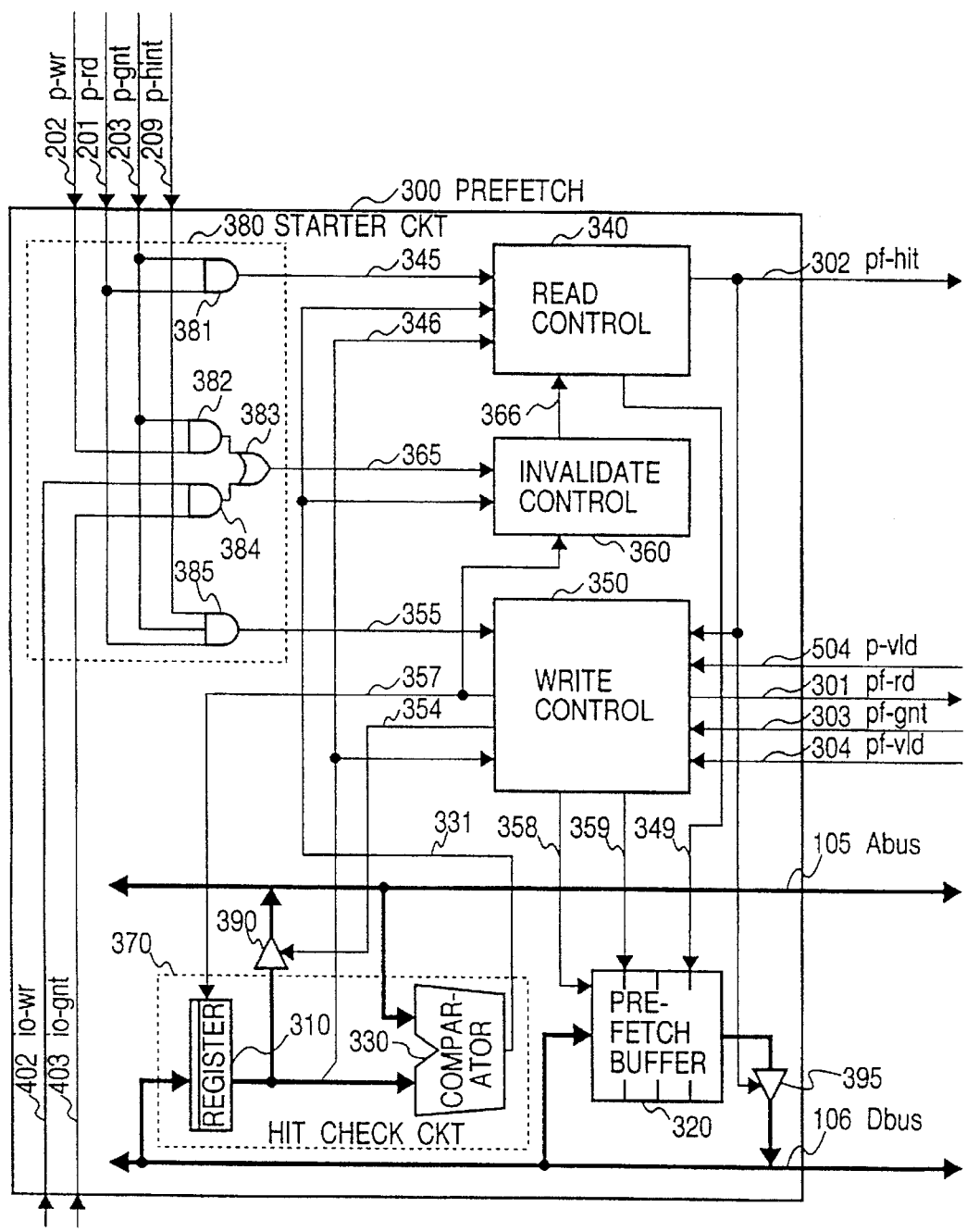
FIG. 2 shows a schematic circuit diagram of the prefetch circuit used in the apparatus shown in FIG. 1.
Figure 3:
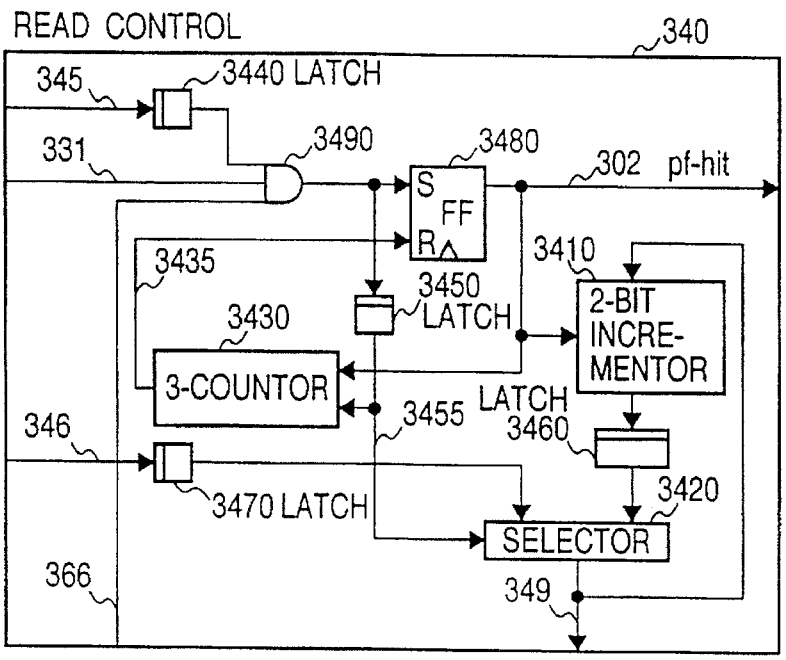
FIG. 3 shows a schematic circuit diagram of the read control circuit used in the apparatus shown in FIG. 2.
Figure 4:
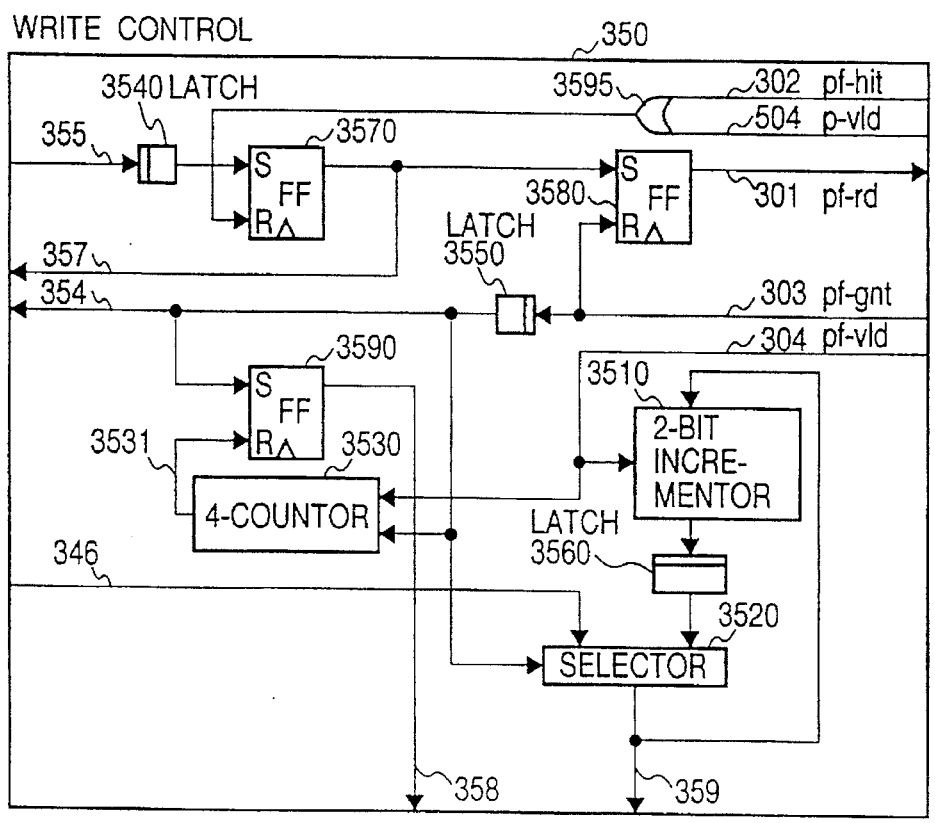
FIG. 4 shows a schematic circuit diagram of the write control circuit used in the apparatus shown in FIG. 2.

Hereinafter the prefetch circuit 300 and its operation will be described in greater details. FIG. 2 is a block diagram of the prefetch circuit 300.

(Starter circuit 300)

The starter circuit 380 monitors a read requests p-rd and a write requests p-wr output from the processor interface circuit 200, pointer hints p-hint supplied from the processor 600 through the delay circuit 250 (see FIG. 1), bus grant signals p-gnt, io-gnt supplied from the memory access arbitration circuit 500, and write requests io-wr supplied from the I/O bus interface circuit 400 to selectively starts write control circuit 350, read control circuit 340, and invalidate control circuit 360.

Write starting signal 355 is supplied from an AND gate 385 when a read request is being supplied from the processor interface circuit for the read request of the processor 600, and the value of pointer hint signal p-hint provided from the processor 600 is 1 and the bus grant signal p-gnt is output from the memory access arbitration circuit 500. That is, the memory access arbitration circuit 500 grants the bus to the processor interface circuit 200 for the read request caused by a loading instruction with a pointer hint.

Read starting signal 345 is supplied form an AND gate 381 only when the read request from the processor interface circuit 200 is granted for the bus.

Invalidate starting signal 365 is supplied from a set of AND gates 382 and 384, and an OR gate 383 only when the read request from the processor interface circuit 200 or the I/O bus interface circuit 400 is granted for the bus.
(Write control circuit 350)

In the drawings, the write control circuit 350 is a circuit which, when the processor 600 performs a loading instruction with a pointer hint, uses the data loaded by this loading instruction to prefetch the block associated to that address from the main memory 700 to write to a prefetch buffer 320.

As described with reference to the memory read operation, the processor interface circuit 200 sends the read request p-rd and an associated memory address to the memory access arbitration circuit 500 in response to the read request from the processor 600, then the memory access arbitration circuit 500 responding to the read request sends back a bus grant signal p-gnt and accesses the main memory 700 to send back a plurality of data, for example four, with a corresponding data valid signal p-vld.

Similarly, the write control circuit 350 is made to send a request pf-rd for prefetching to the memory access arbitration circuit 500 through a line 301. The circuit 500, in response thereto similarly to the read request p-rd, is made to send back a bus grant signal pf-gnt through a line 303 as well as to access the main memory 700 to send a plurality of data onto the internal bus 105 and to send back the data valid signal pf-vld corresponding to respective data through a line 304.

More specifically, in this write control circuit 350, the write starting signal 355 sets a flip-flop 3570 after a one-bit latch 3540 for timing is captured. The flip-flop 3570 provides its output to the register 310 (see FIG. 1) through a line 357 as a set signal. When the memory access arbitration circuit 500 supplies a data valid signal p-vld to a line 504 for the first time, in response to the read request supplied from the processor interface circuit 200 for the currently performed loading instruction with a pointer hint, the signal p-vld rests the flip-flop 3570 through an OR gate 3595. This signal is supplied repeatedly thereafter, however it does not influence on the reset of the flip-flop 3570. While the output signal 357 of the flip-flop 3570 is high, the register 310 captures data on the date bus 106 for each clock tick. Thus, the register 310 ultimately captures the data which is supplied to the data bus 106 when a data valid signal p-vld is provided to the memory access arbitration circuit 500 for the first time, i.e., the data requested by the currently performed loading instruction with a pointer hint, then stores that data. As such, the data requested by the currently performed loading instruction with a pointer hint, namely a pointer pointing the address of another data will be captured in the register 310.

The output from the flip-flop 3570 sets a flip-flop 3580 in the succeeding cycle. The flip-flop 3580 supplies its output to the memory access arbitration circuit 500 through the line 301 as a read request pf-rd for prefetching.

When a bus grant signal pf-gnt is sent back to the memory access arbitration circuit 500 through the line 303 in response to the read request pf-rd, the bus grant signal pf-gnt is set into a latch for timing adjustment, and this latch 3550 supplies its output to a tri-state buffer 390 (see FIG. 2) through a line 354. The tri-state buffer 390, in response to this signal on the line 354, provides to the memory access arbitration circuit 500 through the internal bus 105 the pointer stored in the register 310 (see FIG. 2) as a prefetching address. Thus, the prefetching of the data with that address is started. This data, once loaded from the main memory 700, is supplied to the prefetch buffer 320 (see FIG. 2) through the data bus 106.

In the present embodiment, the read/write from and to the main memory 700 is supposed to be performed by one by one block basis. Thus in the data prefetching, a plurality of remained data in the block to which the data at the address above belongs, such as three items of data in the present embodiment for example, is also read out to the data bus 106 from the main memory 700 in a sequential manner. This is the same to the memory read request from the processor interface circuit 200. The bus grant signal pf-gnt previously supplied to the line 303 from the memory access arbitration circuit 500 resets the flip-flop 3580, at the time it arrives to the latch 3550, then the flip-flop 3580 stops output of read request pf-rd being already provided.

The data loaded from the main memory 700 is stored in the prefetch buffer 320 in a manner described below.

For storing a plurality of data belonging to the same block, in the present embodiment four items of data, the prefetch buffer 320 comprises four registers. The writing register number for writing data to these registers may be generated as described below. To a selector 3520, two least significant bite of the prefetching address stored in the register 310 are supplied through the line 346 as a default value of the writing register number. When the output instruction signal 354 supplied from the latch 3550 to the tri-state buffer 390 (see FIG. 2) is set high, the selector 3520 selects the default value, and when the signal is low, the selector 3520 selects the output of the latch 3560. The selector output 359 is supplied also to a 2-bit incrementor 3510. The memory access arbitration circuit 500 is operated for supplying a data valid signal pf-vld through the line 304 each time it sends each of four items of data from the main memory 700 to the data bus 106.

The 2-bit incrementor 3510 increments by one the writing register number 359 output from the selector 3520 when the data valid signal pf-vld line 304 is high, and outputs the writing register number 359 without changes when the data valid signal is low. The output of the writing register number 359 is stored in the 2-bit latch 3560 once, then provided again to the selector 3520. Therefore, when the bus grant signal pf-gnt goes high and the output from the latch 3550 becomes high thereby, the selector 3520 selects the default register number on the line 346. The selected default value of the register number is supplied to the prefetch buffer 320 then to the 2-bit incrementor 3510. At this point, as the data valid signal pf-vld is still set low, the 2-bit incrementor 3510 sets the default register number as it is to the latch 3520. Than, as the output from the latch 3550 is already low, the selector 3520 selects the output from the 2-bit latch 3560 as the writing register number to provide to the prefetch buffer 320. Thereafter, until the data valid signal pf-vld becomes high, the selector 3520 repeatedly provides the default value to the prefetch buffer. Then, each time the data valid signal pf-vld becomes enabled, the 2-bit incrementor 3510 increments by one the output from the selector 3520. The updated register number is selected by the selector 3520 through the 2-bit latch 3560 to supply to the prefetch buffer 320. As such, four register numbers are generated in a sequential manner.

The writing signal to the prefetch buffer 320 is generated as described below. The bus grant signal pf-gnt sets the flip-flop 3590 one more cycle after the timing set in the latch 3550. The set output of the flip-flop 3590 is supplied to the prefetch buffer 320 through the line 358 as a writing signal of the data prefetched from the main memory 700. While the signal 358 is high, the prefetch buffer 320 captures the data on the data bus 106 into the register of the register number supplied through the line 359 each clock. Therefore the register having the default value of the register number in the prefetch buffer 320 captures and stores the data on the data bus 106 when the data valid signal pf-vld is enabled for the first time. For other registers, each time a new data valid signal pf-vld is output, they capture and stores the data on the data bus 106 at that time.

A 4-counter 3530 is reset to 0 by the output instruction signal 354 sent to the tri-state buffer 390 to count the number that the data valid signal pf-vld on the line 304 becomes high, and when the count reaches to 4, it sets the signal 3531 high and resets the flip-flop 3590. As such the writing signal is generated for the four items of data.

It should be noted here that the operation described above is also applicable to the case in which the succeeding loading instruction is a loading instruction with a pointer hint and the hit check at the hit check circuit 370 for this instruction is hit, except for the difference described below. In such a case, as described below, the operation is different from the operation described above, in which the data stored in the prefetch buffer 320 at that time is output to the data bus 106 but also set to the address register 310 to be used for the prefetching for the succeeding loading instruction. In addition, in this case, as described below, a prefetch hit signal pf-hit is output from the read control circuit 340 to the line 302. Instead of the data valid signal p-vld described above, this signal is provided to the flip-flop 3570 through the OR gate 3595, in order to be used for resetting the flip-flop 3570.

(Hit check circuit 370)

The hit check circuit 370 comprises a comparator 330 determining whether or not the address provided to the internal bus 105 and associated to the read request or write request issued from the processor interface circuit 200 or the I/O bus interface circuit 400 matches with the pointer. The result 331 of this circuit is used by the read control circuit 340 and the invalidate control circuit 360.

(Read control circuit 340)

The read control circuit 340 is a circuit for supplying a prefetched block from the prefetch buffer 320 through the processor interface circuit 200 to the processor 600 after a prefetching has been performed, when the data in the prefetched block is requested by a succeeding loading instruction. That is, when the instruction performed by the CPU after the prefetching is a loading instruction, and a hit is detected at the hit check circuit 370, the read control circuit 340 reads out the block stored in the prefetch buffer 320 to provide to the processor 600 through the processor interface circuit 200.

More specifically, the cache control circuit 630 outputs a read request to the processor interface circuit 200 if there is not data requested by the succeeding loading instruction in the cache 620. The circuit 200 issues a read request p-rd in response to the read request. The read control circuit 340 then responds to this read request. Thus, the read control circuit 340 is started if a read starting signal 345 is provided by the starter circuit 380. At this moment, if a match signal 331 form the hit check circuit is provided, and a prefetching buffer enable signal 366 from the invalidate control circuit 360 is input, the circuit reads the data in the block in the prefetching buffer sequentially in a manner described later, and supplies a hit signal pf-hit to a tri-state buffer 395 (see FIG. 2) and an OR gate 260 (see FIG. 2) as well as the memory access arbitration circuit 500 through the line 302. The tri-state buffer 395 transfers the data read from the prefetch buffer 320 to the data bus 106. The OR gate 260 provides the prefetch hit signal pf-hit to the processor interface circuit 200 instead of the data valid signal p-vld which should be supplied by the memory access arbitration circuit 500, for instructing the capturing of the data on the data bus 106. As such, it can provide the block stored in the prefetch buffer 320 to the processor 600 faster than it reads from the main memory 700. Although the memory access arbitration circuit 500 starts reading data from the main memory 700 in response to the read request p-rd already supplied from the processor interface circuit 200, if a prefetch hit signal pf-hit is supplied from the write control circuit 350, the memory access arbitration circuit 500 is made so as to disable this reading operation. More definitely, it does not provide the data to the data bus data bus 106 when reading the data, nor it does output the data valid signal p-vld to the line 504.

Reading the prefetch buffer 320 is performed as described below. The read register number 349 is generated by using two least significant bits 346 of the memory address stored in the register 301 as the default value of the read register number.

More definitely, the read control circuit 340 is comprised of a 2-bit incrementor 3410 for generating the read address 349 of the prefetch buffer 320, a selector 3420, a 3-counter 3430 for counting the number of data transfer cycles, a flip-flop 3480 for generating hit signal pf-hit 302, one-bit latches 3440, 3450, and 3470 for adjusting the timing, a two-bit latch 3460 and an AND gate 3490. The 2-bit incrementor 3410 increments by one the read register number 349 of the prefetch buffer 320 when the hit signal pf-hit on the line 302 is high, and outputs the read register number 349 without changes when the signal pf-hit is low. The 3-counter 3430 is reset to 0 by the signal 3455 for counting the number that the hit-signal pf-hit on the line 302 becomes high, and resets the flip-flop 3480 generating the hit signal pf-hit 302 by setting the signal 3455 high when the count reaches to 3. The selector 3420 selects the default register number 346, which has been delayed by the latch 3470 when the signal 3455 is high, and it selects the output of the 2-bit incrementor 3410 when the signal 3455 is low to set the read register number 349 of the prefetch buffer 320. The AND gate 3490 sets the flip-flop 3480, and one cycle later sets the signal 3455 high to reset the 3-counter 3430 such that the selector 3420 selects the default number 346 when the read starting signal 345, the match signal 331, and the prefetch buffer enable signal 366 are all high.

(Invalidate control circuit 360)

When the processor 600 performs a store instruction after prefetching, or the I/O control circuit 800 and 810 issue a write request, the invalidate control circuit 360 disables the prefetched block if the hit check circuit 370 detects a cache hit. That is, for data prefetching, when the set signal 357 is supplied to the register 310 storing the prefetch address, the invalidate control circuit 360 generates the prefetch buffer enable signal 366 from the signal 357. Thereafter, when a write request for overwriting the data in the prefetched block is performed, the circuit is started by the invalidate starting signal 365 to reset the prefetch buffer enable signal 366 by using the match signal 331.

Figure 5:
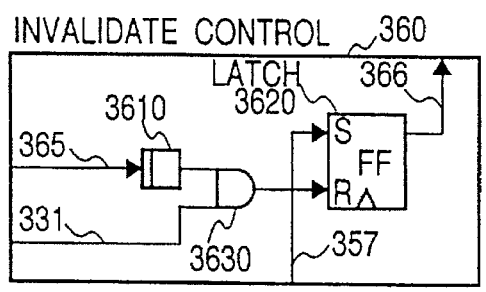
FIG. 5 shows a schematic circuit diagram of the invalidate control circuit used in the apparatus shown in FIG. 2.
Figure 6:
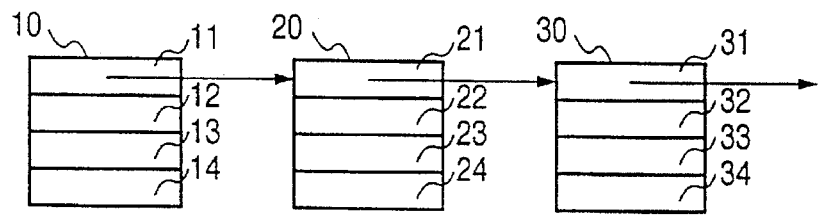
FIG. 6 shows an example of conventional pointer-type data structure.
Figure 7:
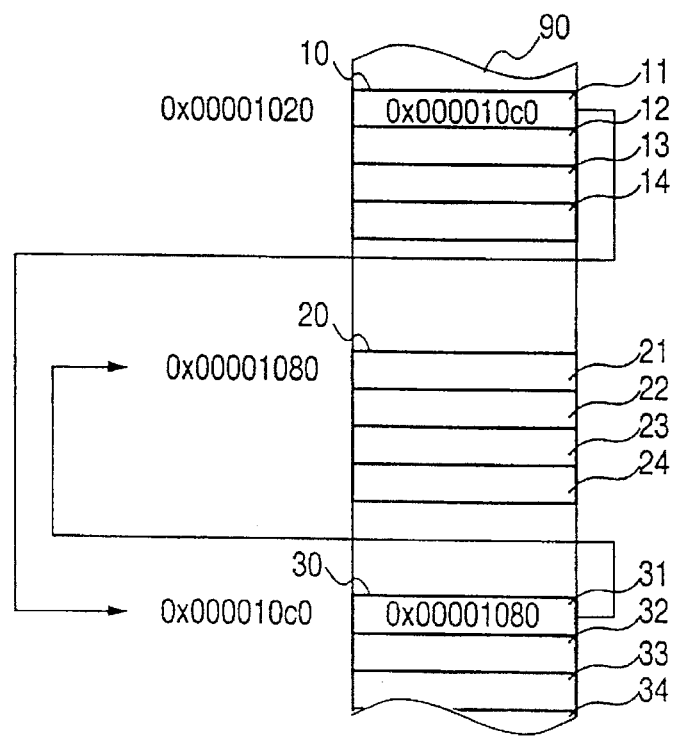
FIG. 7 shows an example of memory location in a memory in which pointer-type data structure shown in FIG. 6 is stored.

More definitely, in FIG. 5, the invalidate control circuit 360 comprises a flip-flop 3620 for generating the prefetch buffer enable signal 366, a one bit latch 3610 for adjusting timing, and an AND gate 3630. The flip-flop 3620 is set by the set signal 357 of the register 310, and is reset if the invalidate starting signal 365 delayed for one cycle and the match signal 331 are both high.

(I/O bus interface circuit 400)

The I/O bus interface circuit 400, essentially similar to the well known circuit, provides read requests io-rd, write requests io-write request to the memory access arbitration circuit 500 through line 401 and 402 respectively, in response to the memory read/write requests requested from the I/O control circuits 800 and 810 through the I/O bus 801, and receives the bus grant signal io-gnt, data valid signal io-vld from that memory access arbitration circuit 500 through line 403 and 404 respectively, in order to data transfer through the internal bus 105 and the data bus 106 with the same protocol as the processor interface circuit 200.

SECOND EMBODIMENT

Figure 9:
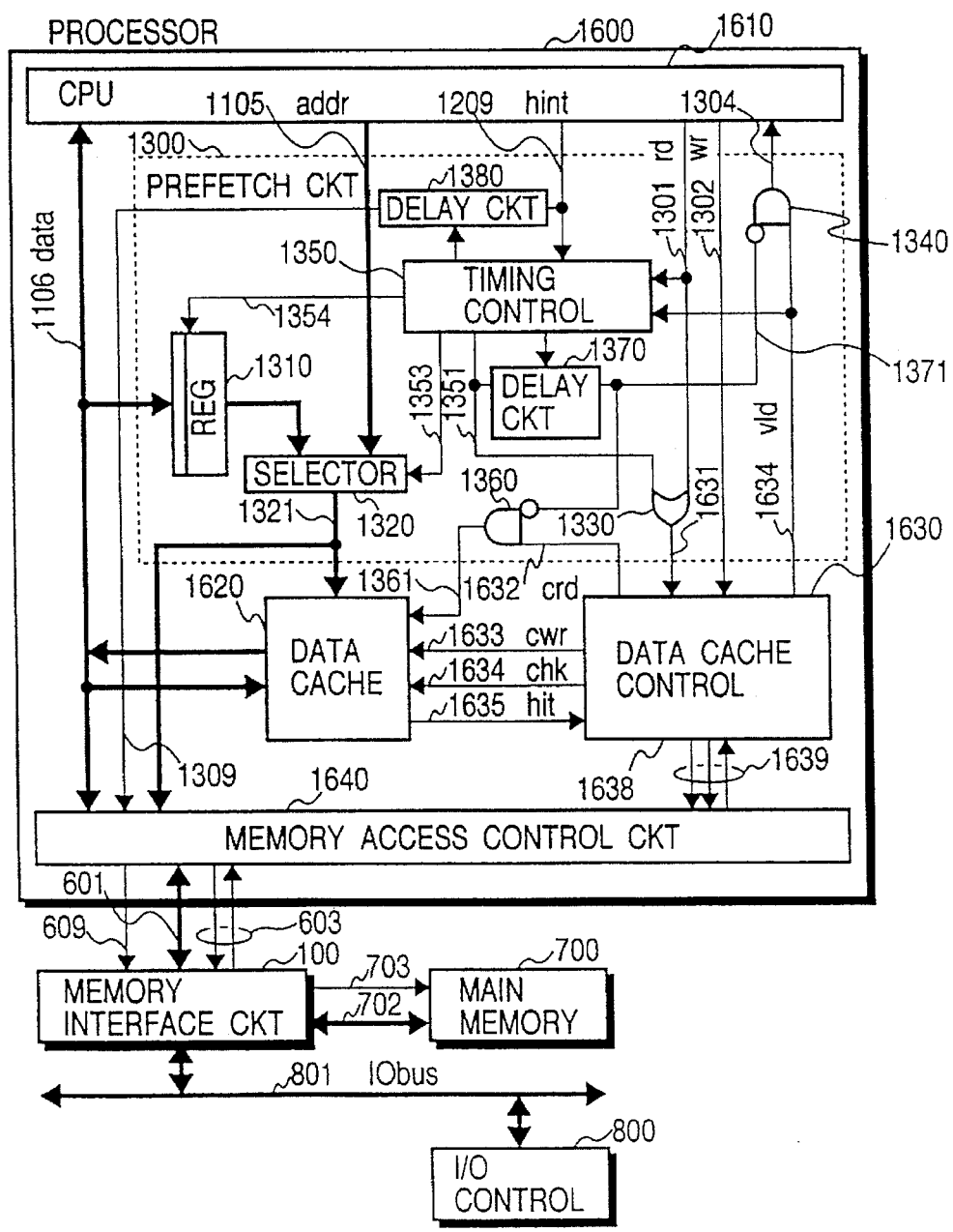
FIG. 9 shows a second embodiment of an information processing apparatus performing a method for prefetching data according to the present invention.

FIG. 9 shows second embodiment with a prefetch circuit in its processor according to the present invention. In this embodiment, similar to the first embodiment described above, the processor 1600 is connected to the main memory 700 and the I/O control circuit 800 through the memory interface circuit 100. The processor 1600 comprises, in addition to a CPU 1610, a data cache 1620, a data cache control circuit 1630, and a memory access control circuit 1640, unlike to the first embodiment, a prefetch control circuit 1300, which is characteristic to the present invention. Also, in this embodiment, a prefetch circuit is provided in the processor to store the prefetched block in the data cache 1620. Thus the prefetch buffer 320 provided in the first embodiment is no longer required for this embodiment. The hit check performed by the hit check circuit 370 in the first embodiment will be achieved by using the hit check functionality of the data cache itself. Hence the address comparator 330 shown in the first embodiment is no longer necessary for this embodiment. As can be seen by comparing the prefetch control circuit 1300 of this embodiment with the prefetch circuit 300 (see FIG. 2) of the first embodiment, the functionality of the read control circuit 340 and the invalidate control circuit 360 of the first embodiment is realized here by using the reading function and the data invalidate function to the data cache 1620, both functions being provided by the data cache control circuit 1630 itself. Therefore the prefetch control circuit 1300 of this embodiment no longer requires such circuits 340 and 360. Besides, although the present embodiment also comprises an instruction cache for storing instructions and an instruction cache control circuit for controlling the operation thereof, these circuits are not shown in the drawings for the purpose of simplicity, nor described hereinbelow.

The operation of conventional load/store instruction in the present embodiment will be briefly described. Essentially the operation of the processor is similar to that of the Prior Art. When the CPU 1610 performs a loading instruction, it sets a read request signal rd 1301 high as well as it sends the address of the data that it desires to load onto the address bus addr 1105 to request for reading process to the data cache control circuit 1630. Then the data cache control circuit 1630 sets a cache retrieval instruction signal chk 1634 high to search the data cache 1620 and it receives the results by a hit signal hit 1635. If hit occurs, the data cache control circuit 1630 uses cache read signal crd 1632 to load data from data cache 1620, to send data to the data bus data 1106, to set the data valid signal 1634 high to send back data to the CPU 1610. If not, the data cache control circuit 1630 uses control signal 1639 to request for a block read from the main memory 700 to the memory access control circuit 1640 and uses cache write signal 1633 to write the data from the main memory 700 to the data cache 1620 and send back the data to the CPU 1610.

When the CPU 1610 performs a store instruction, it sets a write request signal wr 1302 high and send the address to the address bus addr 1105, the data to be stored to the data bus data bus data 1106, request for a write process to the data cache control circuit 1630. The data cache control circuit 1630 then sets the cache check instruction signal chk 1634 high to search the cache 1620. Thereafter, if hit occurs, it writes on the data cache 1620. If not, it performs a block read from the main memory 700 then writes the data to be stored into the data cache 1620.

The CPU 1610 performs loading instructions with a pointer hint in the present embodiment, similarly to the first embodiment. When the CPU 1610 decodes a loading instruction with a pointer hint it sets hint signal hint high, then notify to the prefetch control circuit 1300 through the line 1209. Here, the prefetch control circuit 1300 comprises a prefetch address register 1310, an address selector 1320, a timing control circuit 1350, delay circuits 1370 and 1380 for timing control, and gates 1330, 1340, and 1360 for correcting the control signal of the data cache control circuit 1630. When the prefetch control circuit 1300 detects a read request with a pointer hint, it captures the value of the data bus data 1106 into the prefetch address register 1310 while the data valid signal 1634 is maintained high. Then it uses the address selector 1320 to select the prefetch address register 1310, to set the prefetch request signal 1351 high, to send a read request to the data cache control circuit 1630.

The data cache control circuit 1630 attempts to send back data to the CPU 1610 from the cache if hit occurs, or from the main memory 700 if not. However, as the prefetched data is not required to be sent back to the CPU 1610, the prefetch control circuit 1300 controls the cache read request signal 1361 and the data valid signal 1304 so as not to set them high, in order to prevent the data cache 1620 from performing read process and send back process to the CPU 1610.

The prefetched block may become available by a following loading instruction, similarly to the fetched block from the main memory 700 by conventional loading instruction.

Unlike the first embodiment, the present embodiment does not require a prefetch buffer separately provided from the cache, and such circuits as invalidate control circuit, read control circuit, etc., used in the first embodiment so that the circuitry becomes simple. Moreover, it attempts not to prefetch if the block containing the data requested by a loading instruction with a pointer hint is stored in the data cache, so that the present embodiment has an advantage not to perform unnecessary prefetching of blocks as can be seen in the first embodiment.

THIRD EMBODIMENT

In the first and second embodiments above, the present invention has been described on the assumption that the address from the processor 600 and the address in the block loaded from the main memory 700 pointing another block are both used for reading from the main memory 700. However, in practice, in usual programs except for such program as operating systems, there may be difference between the address seen from the program (logical address) and the address in the main memory (physical address), so that a logical address is translated to a physical address within the processor by using TLB.

Operating systems may access the memory by using physical addresses. Furthermore operating systems may access the memory area with logical addresses equal to physical addresses. The performance of operating systems may be improved by using loading instructions with a pointer hint only when accessing to such memory area.

Figure 10:
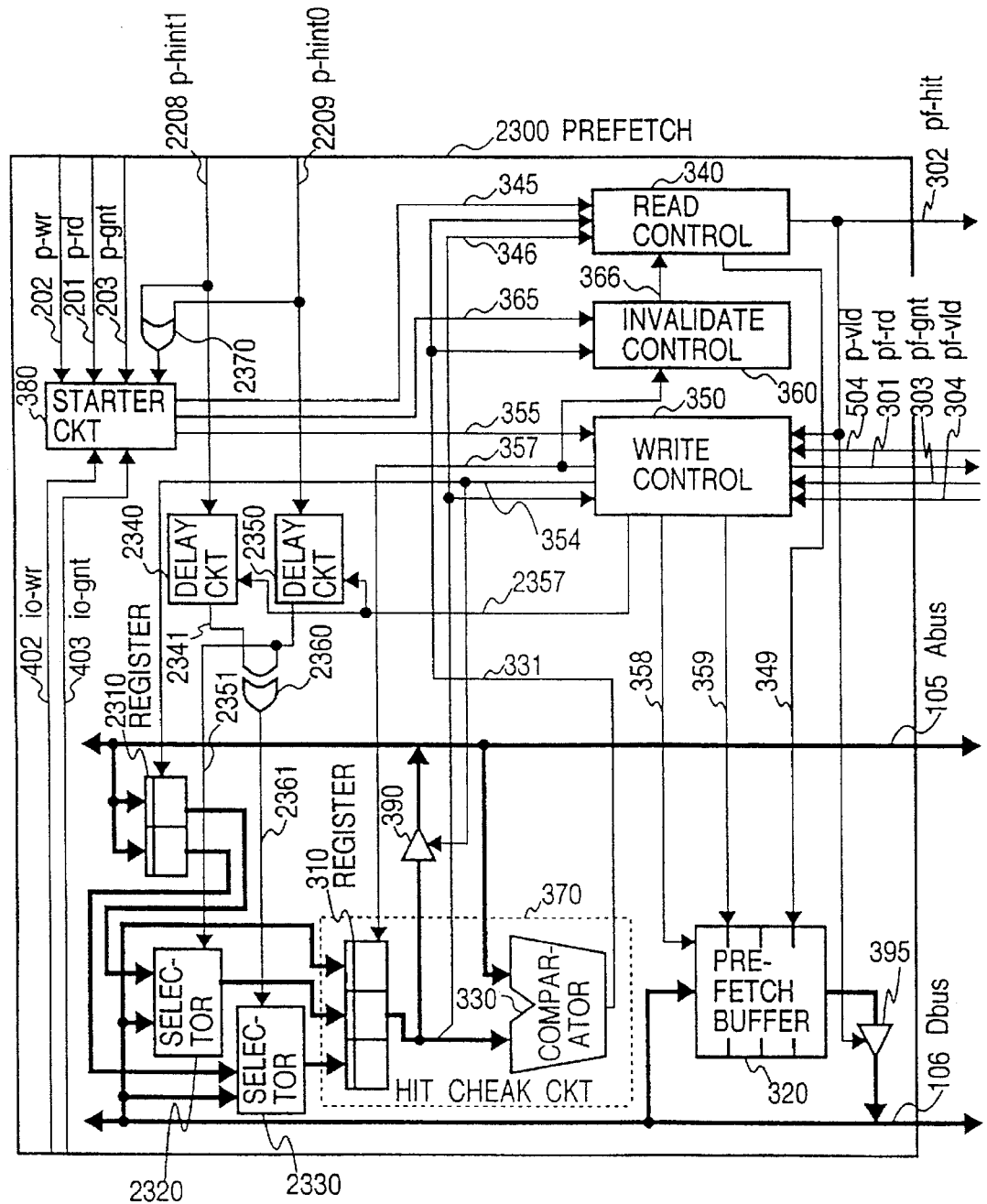
FIG. 10 shows a third embodiment of an information processing apparatus performing a method for prefetching data according to the present invention.

FIG. 10 shows a prefetch circuit 2300 in which an address translation circuit is added to the prefetch circuit 300 of FIG. 2 for applying the present invention to the programs which performs logical address access.

In the present embodiment, the processor 600 is supposed to output two-bit hint information p-hint1 (signal 2208) and p-hint0 (signal 2209) including information on the address translation for pointer prefetching. For example, no prefetch hint exists when hint information p-hint1 and p-hint0 are 00, pointer prefetch exists within a 4K byte page in the case of 01, pointer prefetch exists within a 1M byte page in the case of 10, and pointer prefetch exists by physical addressing when 11 are defined.

The operation in this prefetch circuit 2300 is the same as the read process without pointer hint and the read process with a pointer hint, in case where the hint information p-hint1 and p-hint0 are 00 sand 11, respectively. The operation differs when the hint information p-hint1 and p-hint0 are 01 or 10. In these cases, loaded data is not used for prefetch addresses as is, but physical addresses used in the previous load are used for page addresses according to the page size. The prefetch operation in such case will be described hereinbelow.

The prefetch circuit 2300 is different from the prefetch circuit 230 shown in FIG. 2 in the following manner: it receives 2 bits for prefetch hint information; register 2310, selectors 2320 and 2330, delay circuits 2340 and 2350, an Exclusive-OR circuit 2360, and an OR circuit 2370 are added; and a circuit for generating a signal 2357 for controlling delay circuits 2340 and 2350 is added to the write control circuit 350. Further description will be omitted for the rest of this circuitry which operates similarly to the prefetch circuit 230 of FIG. 2.

The OR circuit 2370 notifies to the starter circuit 380 the loading instruction with a pointer hint. For the prefetch processing, at the time that the address of the register 310 is output to the address bus 105, the register 2310 latches that address. This address is a physical address for accessing the main memory 700. The delay circuits 2340 and 2350 are under control of the write control circuit 350 via a signal 2357, and output the hint information p-hint1 and p-hint0 to the signals 2341 and 2351, with the same timing as the set signal 357 of the register 310. When writing on the register 310 the address to be prefetched succeedingly from the block loaded by the loading instruction with a pointer hint, the selectors 2320 and 2330 select the most significant bits of one of the address in the loaded block (logical address) or the physical address stored in the register 2310 according to the control signals 2351 and 2361. That is, in the present embodiment, since the Exclusive-OR circuit 2360 is provided, control signals 2351 and 2361 are generated such that least significant 12 bits of the 32 bit address are set from the data bus 106, while most significant 20 bits of the 32 bit address are set through the selector 2320 when the hint information p-hint1 and p-hint0 are 01, whereas least significant 20 bits are set from the data bus 106 and most significant 12 bits are set through the selector 2330 from the most significant 12 bits of the physical address in the register 2310.

Therefore, when the hint information p-hint1 and p-hint0 are 01, from within the data pertained to the 4K byte page to which the address specified by the loading instruction with a pointer hint belongs, the data with the address specified by the pointer read by this instruction is prefetched. When the hint information p-hint1 and p-hint0 are 10, from within 1M byte page to which the address specified by the loading instruction with a pointer hint pertains, the data with the address specified by the pointer read by this instruction is prefetched.

As can be seen from several embodiments described above, according to the present invention, when an instruction requiring to read data from memory is performed, and that data contains address information of another data, the another data may be read out by using the data read from the memory by the request of that instruction. Originally, the program containing this kind of instructions knows whether or not the data loaded from the memory by any one of these instructions is a pointer pointing another data. Therefore, according to the present invention, another data specified by a pointer is prefetched by performing a loading instruction specifying that pointer, so that the timing of prefetching is allowed to be readily determined. In addition, each time one of these instructions is performed, the data used by the immediately succeeding instruction is prefetched, so that the circuit architecture necessary for prefetching becomes simple. Also, since the prefetched data is in most cases assured to be used, in other words, there is not a strong possibility that the prefetched data will not be used, the prefetching will be useful in most cases.

What is claimed is:

1. A data prefetch method in an information processing apparatus having a memory for holding data and a processor for executing instructions, the method comprising the steps of:

reading out first data from a first storage location of said memory, in response to execution of a first data read instruction which requests readout of said first data from said memory;

supplying said read out first data to said processor;

prefetching second data from a second storage location of said memory which is selected dependent upon said first data as read out, in response to said first data read instruction further requesting prefetch of said second data;

temporally holding said prefetched second data; and, supplying said temporally held second data to said processor, in response to subsequent execution of a second data read instruction by said processor, which requires readout of said second data from said memory.

2. A method according to claim 1, wherein said information processing apparatus further includes a cache which holds part of data held in said memory and a temporal data storage different from said cache, wherein said method further includes the steps of:

detecting whether said first data is held in said cache, in response to said execution of said first instruction;

supplying said first data from said cache to said processor, in case said first data is held in said cache; and, starting said step of reading out said first data from memory, in case said first data is not held in said cache;

wherein said step of temporally holding said second data includes holding said prefetched second data in said temporal data storage; and, wherein said method further includes the steps of:

detecting whether said second data is held in said cache, in response to said execution of said second instruction;

supplying said second data from said cache to said processor, in case said second data is held in said cache;

issuing a read request of said second data to said memory, in case said second data is not held in said cache;

detecting whether said second data is held in said temporal data storage, in response to said issued read request; and, starting said step of supplying said second data, so that said second data is supplied from said temporal data storage to said processor, in case said second data is held in said temporal data storage.

3. A method according to claim 2, wherein said reading out step of said first data includes the steps of:

reading out a first block including said first data from said memory; and, writing said read out first block into said cache;

wherein said supplying step of said first data includes a step of selecting said first data from said read out first block and supplying said selected first data to said processor;

wherein said prefetching step of said second data includes a step of prefetching from said memory, a second block which includes said second data;

wherein said temporally holding step of said prefetched second data includes a step of writing said prefetched second block into said temporal data storage; and, wherein said supplying step of said second data includes a step of selecting said second data from said second block as written into said temporal data storage and supplying said selected second data to said processor.

4. A method according to claim 3, further comprising a step of invalidating said second block held in said temporal data storage, in response to said processor's execution of a third instruction after said prefetching step, said third instruction requesting writing of data into said second block held in said memory.

5. A method according to claim 1, wherein said information processing apparatus further includes a cache which holds part of the data held in said memory;

wherein said method further includes the steps of:

detecting whether said first data is held in said cache, in response to said execution of said first instruction;

supplying said first data from said cache to said processor, in case said first data is held in said cache; and, starting said step of reading out said first data from said memory, in case said data is not held in said cache;

wherein said step of temporally holding said second data includes holding said prefetched second data in said cache; and, wherein said method further includes:

detecting whether said second data is held in said cache, in response to said execution of said second instruction;

starting said step of supplying said second data, so that said second data is supplied from said cache to said processor, in case said second data is held in said cache; and, issuing a read request of said second data to said memory, in case said second data is held in said cache.

6. A method according to claim 5, wherein said reading out step of said first data includes the steps of:

reading out a first block including said first data from said memory; and, writing said read out first block into said cache;

wherein said supplying step of said first data includes a step of selecting said first data from said read out first block and supplying said selected first data to said processor;

wherein said prefetching step of said second data includes a step of prefetching from said memory, a second block which includes said second data;

wherein said temporally holding step of said prefetched second data includes a step of writing said prefetched second block into said cache; and, wherein said supplying step of said second data includes a step of selecting said second data from said second block as written into said cache and supplying said selected second data to said processor.

7. A method according to claim 1, wherein said prefetching step of said second data includes the steps of:

holding an address of said first storage location of said memory wherein said first data is held;

combining said held address of said first storage location and said first data as read out from said memory to generate an address of said second storage location of said memory from which said second data is to be prefetched; and, prefetching said second data from said memory, in response to said generated address.

8. A method according to claim 7, wherein said combining step comprises a step of combining an upper part of said held address of said first storage location and a lower part of said read out first data.

9. A data prefetch method according to claim 1, wherein said data read instruction which requests readout of said first data includes a field which indicates whether said data read instruction further requests readout of said second data; and, wherein execution of said prefetching is controlled depending upon a value of said field.

10. A method according to claim 1, wherein the first data is used to point to the second data.

11. An information processing apparatus having:

a memory for holding first and second data;

a processor for executing instructions;

a first data read circuit connected to said memory and said processor and responsive to execution of a data read instruction which requires readout of the first data from said memory, supplying said memory with a read request which requires reading out the first data held in a storage location of said memory as designated by said data read instruction and supplying said processor with the first data as read out from said memory for said read request;

a second data read circuit connected to said memory and said processor and responsive to said data read instruction further requesting prefetch of second data held in a second storage location of said memory, the second storage location being selected dependent upon said first data, supplying said memory with a read request which requires reading out of the second data;

a temporal data storage connected to said memory for temporally holding said second data read out from said memory for said read request supplied by said second data read circuit; and, a data supply circuit connected to said temporal data storage and said processor and responsive to execution of another data read instruction by said processor which requires readout of said second data from said memory, supplying said second data from said temporal data storage to said processor.

12. An information processing apparatus according to claim 11, wherein said processor includes:

a processing unit for executing instructions;

a cache which holds part of data held in said memory; and, a cache control connected to said processing unit, said cache and said memory, responsive to execution of a data read instruction by said processing unit, detecting whether data requested by said data read instruction is held in said cache and supplying said data requested by said data read instruction to said processing unit, in case said data requested by said data read instruction is held in said cache;

wherein said first read request circuit includes a read request circuit provided in said cache control, supplying said memory with a read request for said data read instruction, in case said data requested by said data read instruction is not held in said cache;

wherein said cache is used as said temporal data storage; and, wherein said data supply circuit comprises a circuit included in said cache control.

13. An information processing apparatus according to claim 11, wherein said processor includes:

a processing unit for executing instructions;

a cache which holds part of the data held in said memory; and, a cache control connected to said processing unit, said cache and said memory, the cache control being responsive to said processing unit executing a data read instruction which requires readout of data from said memory, detecting whether said data required by said data read instruction is held in said cache and supplying said data to said processing unit from said cache, in case said data is held in said cache;

wherein said first read request circuit includes a read request circuit provided in said cache control, supplying said memory with a read request, in case said data required by said data read instruction is not held in said cache;

wherein said temporal data storage is a storage different from said cache; and, wherein said data supply circuit includes:

a detect circuit connected to said first read request circuit and responsive to said first read request circuit supplying said data read request supplied to said memory for said data read instruction, detecting whether said data required by said data read instruction is held in said temporal data storage; and, a data supply circuit connected to said detect circuit and said temporal data storage, supplying said cache control with said data required by said data read instruction from said temporal data storage, as data read out from said memory, in case said data as required by said data read instruction is held in said temporal data storage.

14. An information processing apparatus according to claim 13, wherein said detect circuit includes a write data detect circuit connected to said processing unit and responsive to execution of a data write instruction which requires writing the data into a storage location of said memory designated by said data write instruction, for detecting whether the data belonging to said storage location of said memory designated by said data write instruction is held in said temporal data storage; and, wherein said information processing apparatus further includes a data invalidating circuit connected to said write data detect circuit and said temporal data storage, invalidating said data belonging to said storage location of said memory designated by said data write instruction, in case said data belonging to said storage location of said memory designated by said data write instruction is held in said temporal data storage.

15. An information processing apparatus according to claim 11, wherein said data read instruction which requires readout of said data from said memory includes a field which indicates whether said data read instruction further requires readout of said another data; and, wherein said second data read circuit responds to said field of said data read instruction.

16. An information processing apparatus according to claim 11 further including a pointer which uses the first data to point to the second memory location holding the second data.

17. A data prefetch method in an information processing apparatus having a memory for holding data and a processor for executing instructions, the method comprising the steps of:

reading out first data from a first storage location of said memory, in response to execution of a first data read instruction which requests readout of said first data from said memory;

supplying said read out first data to said processor;

prefetching second data from a second storage location of said memory when said first data read instruction indicates to prefetch said second data, the second storage location being pointed to by said first data;

temporally holding said prefetched second data; and, supplying said temporally held second data to said processor, in response to subsequent execution of a second data read instruction by said processor, which requires readout of said second data from said memory.

* * * * *